US007970956B2

(12) United States Patent
Asaro et al.

(10) Patent No.: US 7,970,956 B2
(45) Date of Patent: Jun. 28, 2011

(54) GRAPHICS-PROCESSING SYSTEM AND METHOD OF BROADCASTING WRITE REQUESTS TO MULTIPLE GRAPHICS DEVICES

(75) Inventors: Anthony Asaro, Toronto (CA); Bo Liu, Richmond Hill (CA)

(73) Assignee: ATI Technologies, Inc., Markham, Ontario (CA)

( * ) Notice: Subject to any disclaimer, the term of this patent is extended or adjusted under 35 U.S.C. 154(b) by 233 days.

(21) Appl. No.: 11/389,945

(22) Filed: Mar. 27, 2006

(65) Prior Publication Data

US 2007/0245046 A1  Oct. 18, 2007

(51) Int. Cl.
G06F 3/00 (2006.01)
G06F 15/16 (2006.01)
G06F 12/00 (2006.01)

(52) U.S. Cl. .............. 710/3; 345/502; 345/503; 711/1; 711/147

(58) Field of Classification Search .............. 710/3
See application file for complete search history.

(56) References Cited

U.S. PATENT DOCUMENTS

| 5,937,204 | A | 8/1999 | Schinnerer |
| 5,960,213 | A | 9/1999 | Wilson |
| 6,223,239 | B1 | 4/2001 | Olarig |
| 6,377,266 | B1 | 4/2002 | Baldwin |
| 6,670,958 | B1* | 12/2003 | Aleksic et al. ............. 345/502 |
| 6,956,579 | B1* | 10/2005 | Diard et al. ............. 345/537 |
| 7,065,630 | B1* | 6/2006 | Ledebohm et al. ......... 711/206 |
| 7,143,227 | B2* | 11/2006 | Maine ............. 710/306 |
| 7,184,038 | B2* | 2/2007 | Sowizral et al. ............. 345/420 |
| 7,383,412 | B1* | 6/2008 | Diard ............. 711/170 |
| 7,525,547 | B1* | 4/2009 | Diard ............. 345/502 |
| 7,568,048 | B2* | 7/2009 | Murakami ............. 709/245 |
| 2002/0059509 | A1 | 5/2002 | Sasaki |
| 2005/0005074 | A1* | 1/2005 | Landin et al. ............. 711/148 |
| 2005/0094729 | A1* | 5/2005 | Yuan et al. ............. 375/240.16 |
| 2005/0190190 | A1* | 9/2005 | Diard et al. ............. 345/502 |
| 2006/0267990 | A1* | 11/2006 | Rogers et al. ............. 345/502 |

OTHER PUBLICATIONS

PCT/IB2007/000772 International Search Report dated Mar. 27, 2007 (3 pgs).
Related European Patent Office Application No. 07 734 098.2-2212 Examination Report dated Sep. 8, 2010 (9 pgs).
Related Chinese Patent Office Application No. 2007780018901.1 Official Action dated Aug. 27, 2010 (11 pgs).

* cited by examiner

Primary Examiner — Henry W Tsai
Assistant Examiner — Michael Sun
(74) Attorney, Agent, or Firm — Guerin & Rodriguez, LLP

(57) ABSTRACT

Described are a system and method for broadcasting write requests to a plurality of graphics devices. A different address range of graphics device addresses is associated with each graphics device of the plurality of graphics devices. A controller receives a write request directed to a memory address and generates a plurality of graphics device addresses based on the memory address of the write request when the memory address is within a particular range of broadcast addresses. An offset may be applied to a reference address in each address range associated with one of the graphics devices when generating the plurality of graphics device addresses. The write request is forwarded to each graphics device of the plurality of graphics devices associated with one of the generated graphics device addresses.

23 Claims, 6 Drawing Sheets

GRAPHICS-PROCESSING SYSTEM AND METHOD OF BROADCASTING WRITE REQUESTS TO MULTIPLE GRAPHICS DEVICES

FIELD OF THE INVENTION

The invention relates generally to graphics-processing systems. More specifically, the invention relates to a graphics-processing system and method of broadcasting write requests to multiple graphics devices.

BACKGROUND

Rendering computer graphic images is a computationally intensive process, involving numerous calculations. Any optimization to the rendering process can improve performance. One improvement is to share the computational workload between a central processing unit (CPU) and a graphics-processing unit (GPU). In typical computer graphics systems, the CPU sends commands and data to the GPU in order to direct the rendering process. From the commands and the data, the GPU renders the graphical image, object, or scene. As another enhancement to performance, some computer graphics systems have two GPUs. By operating in parallel, multiple GPUs can accelerate the rendering process by sharing the rendering workload. For example, the GPUs can each render a different portion of the image, which one of the GPU subsequently combines to produce the final image.

To support multiple external GPUs concurrently, however, the CPU needs to communicate with each GPU, often sending the same rendering commands and data to the GPUs. As are result, many cycles of CPU operation and bandwidth of the CPU bus are consumed transmitting duplicative information. Occupying the resources of the CPU and the CPU bus with such duplicative information prevents such resources from engaging in operations that may be put to more productive use.

SUMMARY

In one aspect, the invention features a graphics-processing system comprising a plurality of graphics devices. A first one of the graphics devices issues a write request to a memory address. A controller is in communication with the plurality of graphics devices to receive the write request from the first one of the graphic devices and to submit the write request to each other graphics device of the plurality of graphics devices when the memory address of the write request is within a particular range of broadcast addresses.

In another aspect, the invention features a graphics-processing system comprising a plurality of graphics devices and a processor submitting a write request to a memory address. A controller generates a plurality of graphics device addresses based on the memory address of the write request when the memory address is within a particular range of broadcast addresses. In addition, the controller applies an offset to a reference address for each graphics device when generating the plurality of graphics device addresses and forwards the write request to each graphics device associated with one of the generated graphics device addresses.

In another aspect, the invention features an integrated circuit chip set comprising a plurality of bridges, a register for storing an offset value, and a controller. Each bridge is associated with a range of graphics device addresses for communicating with one of a plurality of graphics devices. The controller receives a write request directed to a request address and generates a plurality of graphics device addresses from the request address when the request address is within a particular range of broadcast addresses. The controller applies the offset value to a reference address for each bridge when generating the plurality of graphics device addresses and forwards the write request to each bridge associated with one of the generated graphics device addresses.

In another aspect, the invention features an integrated circuit chip set comprising a plurality of bridges and a controller. Each bridge communicates with one of a plurality of graphics devices. The controller receives from one of the bridges a write request directed to a request address and forwards the write request to each of the other bridges when the request address of the write request is within a particular range of broadcast addresses.

In another aspect, the invention features a method for broadcasting write requests from a processor to a plurality of graphics devices. The method comprises receiving from the processor a write request directed to a memory address. A plurality of graphics device addresses is generated based on the memory address of the write request when the memory address is within a particular range of broadcast addresses. An offset is applied to a reference address for each graphics device when generating the plurality of graphics device addresses. The write request is forwarded to each graphics device of the plurality of graphics devices associated with one of the generated graphics device addresses.

In another aspect, the invention features a method for broadcasting write requests from a graphics device to a plurality of graphics devices. The method comprises receiving from a first one of the graphics devices a write request directed to a memory address, and forwarding the write request to each of the other graphics devices of the plurality of graphics devices when the memory address of the write request is within a particular range of broadcast addresses.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, embodiments of the present invention provide an optimization to a graphics rendering process in graphics-processing systems having multiple graphics devices (i.e., GPUs). A dedicated range of memory addresses, referred to as a broadcast address range, functions as shared memory, i.e., memory shared by the multiple graphics devices.

When an incoming memory write request has a request address within the broadcast address range, whether that write request is from a central processing unit or from a GPU, an I/O controller forwards the write request to each of the multiple graphics devices. (When a GPU is the originator of the write request, the I/O controller does not forward the write request back to the GPU.) When determining the graphics device addresses to which to forward the write request, the I/O controller can apply an offset value to the request address. Programmers of graphics driver software can use the flexibility provided by the offset when mapping broadcast addresses to graphics device addresses.

Accordingly, the originator of the write request, i.e., the CPU or GPU, does not need to transmit duplicative commands and data to more than one graphics device; the I/O controller assumes the role of generating the write requests for the multiple graphics devices. The results are reductions in overhead for graphics driver software, in CPU workload, in system bus traffic, and in CPU power consumption.

Figure 1:
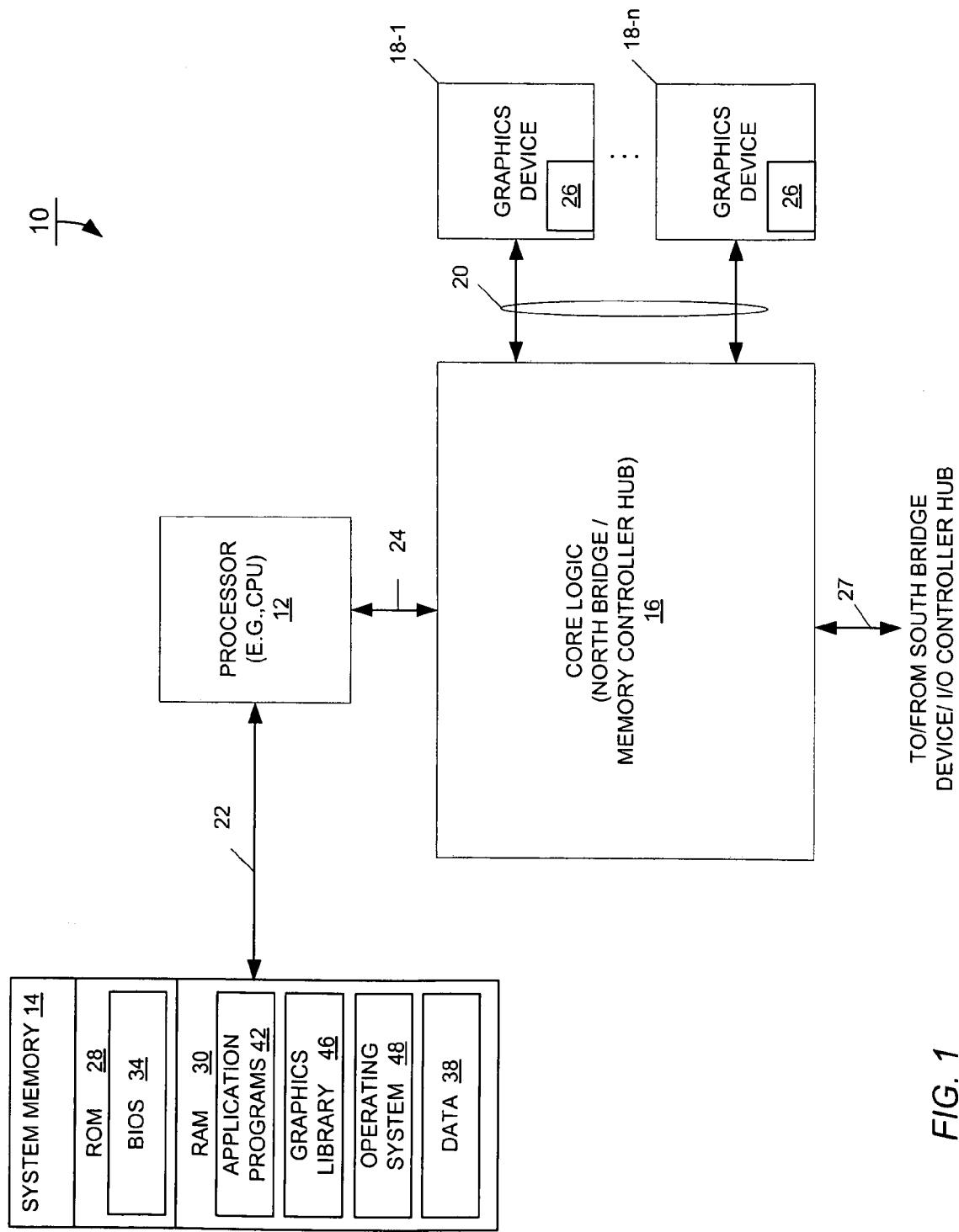
FIG. 1 is a block diagram of an embodiment of a graphics-processing system in which aspects of the invention may be implemented.

FIG. 1 shows an embodiment of a graphics-processing system 10 within which the present invention may be implemented. The graphics-processing system 10 includes a system memory 14 in communication with a processor 12 (e.g. a CPU) over a system bus 22. The processor 12 can be a single or multiple processors operating in parallel. Examples of processors for use in the practice of the invention include Pentium 4 processors of Intel Corporation, Santa Clara, Calif., and K8 processors of AMD of Sunnyvale, Calif. Various examples of graphics-processing environments within which the present invention may be embodied include, but are not limited to, personal computers (PC), Macintosh computers, workstations, laptop computers, server systems, handheld devices, and game consoles.

The processor 12 is also in communication with core logic 16 (also known as a North Bridge or as a Memory Controller Hub) over a processor bus 24. The core logic 16 can be embodied in one or more integrated circuits of a chipset. The core logic 16 is in communication with a plurality of graphics devices 18-1, 18-n (generally, 18) over bus 20 and with a South Bridge device (not shown) over bus 27. Generally, each graphics device 18 is a graphics card having a graphics-processing unit (GPU), not shown, for rendering images based on commands and data from the processor 12. The principles of the invention also apply to graphics-processing systems with more than two graphics devices 18. The bus 20 can include one shared bus or multiple separate busses between the core logic 16 and the graphics devices 18. In one embodiment, the bus 20 includes a PCI-Express bus.

Through commands and data (e.g., for texturing, shading, lighting), the processor 12 instructs the graphics devices 18 to render an image for display. For storing pixel data associated with the rendered image, each graphics device 18 also includes graphics memory 26 (e.g., a frame buffer). In other embodiments, the graphics memories 26 can be part of the system memory 14 or combined in a single memory region accessible to each of the graphics devices 18.

In the graphics-processing system 10, different configurations for the graphics devices 18 include parallel operation and primary-secondary (i.e., master-slave) operation. During parallel operation, each graphics device 18 typically receives the same rendering commands and data (e.g., texture maps). For example, each graphics device 18 can require access to the same texture map and receive the same rendering commands if the graphics devices are rendering different sections of the same object surface.

In a primary-secondary configuration, one of the graphics devices 18 is a primary graphics device and another of the graphics devices 18 is a secondary graphics device. In general, the processor 12 sends commands and data to each graphics device to distribute the workload for rendering an image across the graphics devices. The primary graphics device can then send the rendering results to the secondary graphics device.

The system memory 14 includes non-volatile computer storage media, such as read-only memory (ROM) 28, and volatile computer storage media, such as random-access memory (RAM) 30. Typically stored in the ROM 28 is a basic input/output system (BIOS) 34. The BIOS 34 contains program code for controlling basic operations of the graphics-processing system 10, including start-up and initialization of its hardware. In addition, the BIOS 34 contains program code for identifying and reserving a broadcast range of addresses for shared use by the graphics devices 18, as described herein. The BIOS 34 ensures that no other devices in the graphics-processing system 10 reserves a portion of or the entire broadcast address range for its own use. In brief, write requests issued to an address that is within this broadcast address range are distributed to each of the graphics devices (except, in instances of peer-to-peer communications between graphics devices, such as during master-slave operation, to the graphics device sending the write request).

Stored within the RAM 30 are program code and data 38. Program code includes, but is not limited to, application programs 42, a graphics library 46, and an operating system 48 (e.g., Windows 95™, Windows 98™, Windows NT 4.0, Windows XP™, Windows 2000™, Linux™, SunOS™, and MAC OS™). Examples of application programs 42 include, but are not limited to, standalone and networked video games, simulation programs, word processing programs, and spreadsheet programs. The graphics library 46 includes a graphics driver for communicating with the graphics devices 18 and for implementing the capabilities associated with the broadcast address range described in more detail below.

Figure 2:
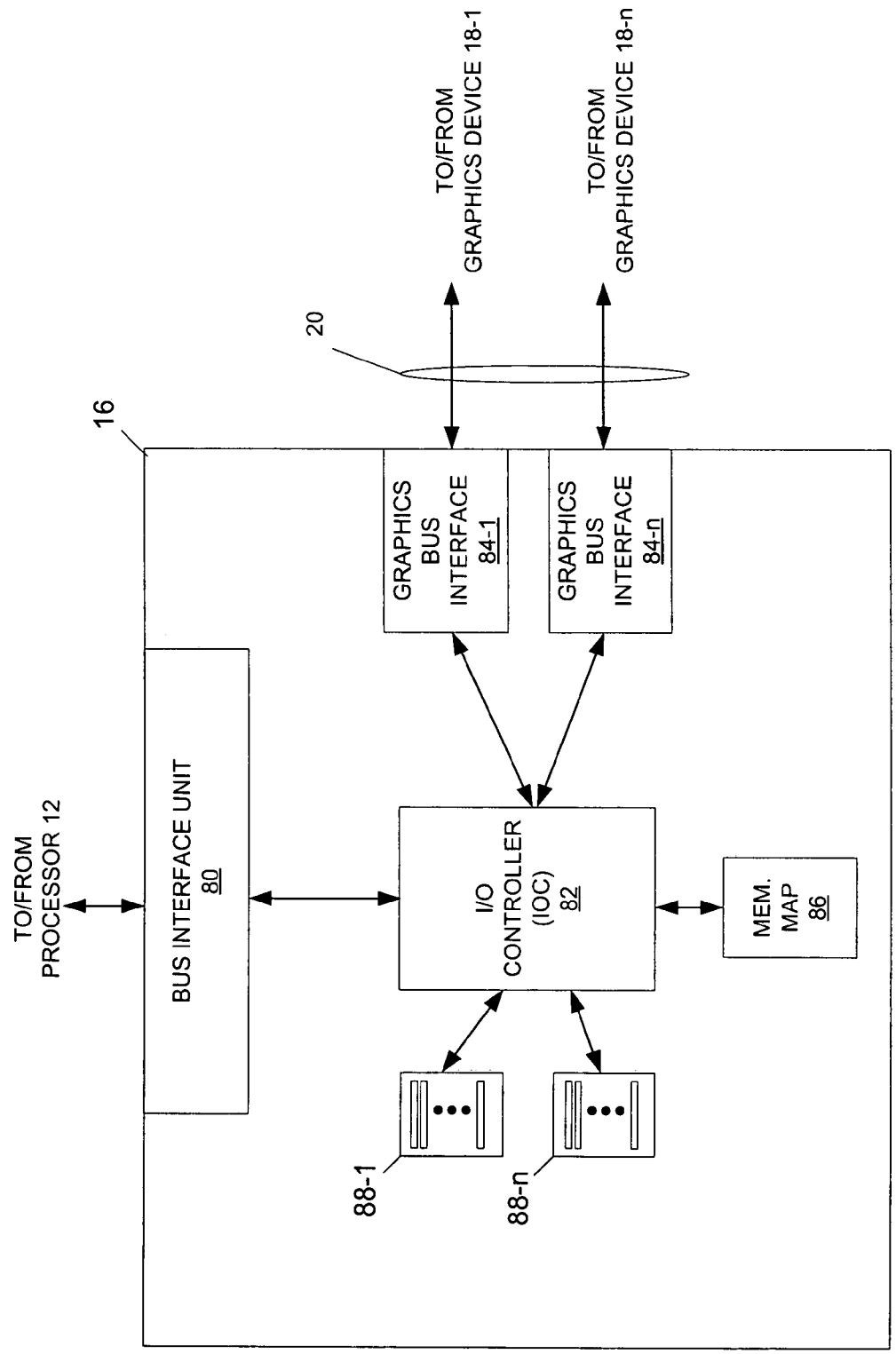
FIG. 2 shows a block diagram of an embodiment of core logic used to broadcast write requests to a plurality of graphics devices.

FIG. 2 shows an embodiment of the core logic 16 of FIG. 1. The core logic 16 includes a bus interface unit 80 in communication with an I/O controller (IOC) 82. The bus interface unit 80 handles communications to and from the processor 12. The IOC 82 is also in communication with a plurality of bridges 84-1, 84-n (generally, 84) for handling communications to and from the graphics devices 18, with a memory map 86, and with sets of configuration registers 88-1, 88-n (generally, 88). Each bridge 84 is in communication with one of the external graphics devices 18 and is associated with one of the bridges 84. In one embodiment, the bridges 84 are PCI bridges, and each bridge 84 has a corresponding PCI configuration space (i.e., a set of configuration registers 88).

The memory map 86 represents the available memory addresses in the graphics-processing system 10. The graphics-processing system 10 employs memory-mapped I/O to communicate among the processor 12 and graphics devices 18 (and other I/O devices—not shown). Each graphics device 18 in the graphics-processing system 10 is uniquely associated with a different range of memory addresses in the memory map 86. Reading from an address in the address range associated with a particular graphics device causes data to be read from that graphics device. Similarly, writing data or issuing a command to an address in the address range associated with a particular graphics device causes data to be written to that graphics device.

The memory map 86 also includes a particular range of broadcast addresses shared by the graphics devices 18. A write request to an address in the range of broadcast address causes the write request to be broadcast to a plurality of the graphics devices sharing the broadcast address range. A read request to an address in the broadcast address range causes data to be read from one of the graphics devices (e.g., a designated primary graphics device).

Figure 4:
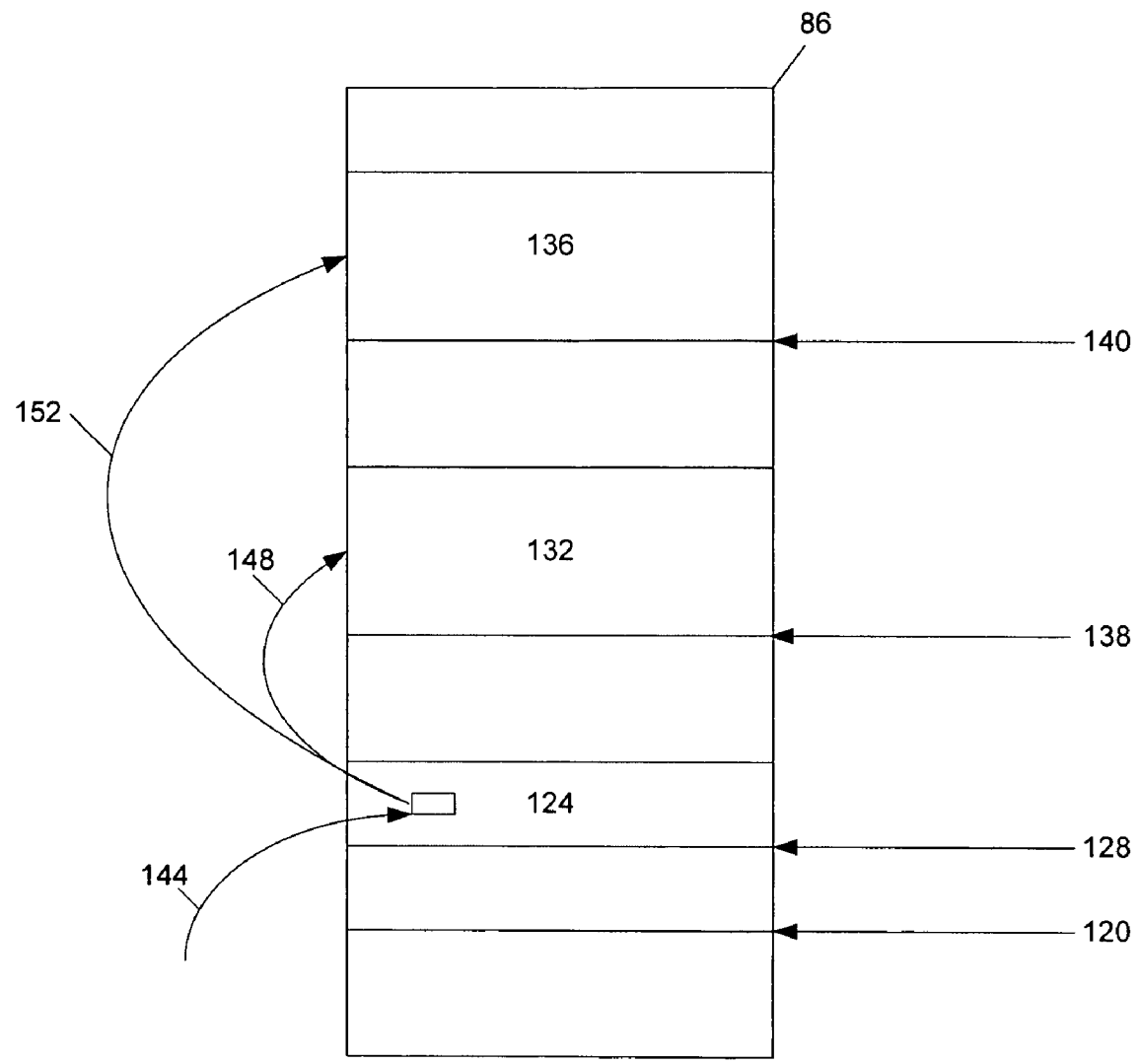
FIG. 4 shows a block diagram of a memory map including a broadcast address range and plurality of graphics device address ranges.

In general, each set of configuration registers 88 is memory for storing values that determine and allocate the type, amount, and location of memory and I/O space that an associated bridge can use. One register in each set is for storing a base address. The base address stored in the first register corresponds to the first (or start) address of the memory address range (in memory map 86) associated with the graphics device 18. Each set 88 can also have second register for storing an offset value. The offset value stored in the second register corresponds to an offset between a broadcast base address and the base address of a graphics device address range (FIG. 4). The offset is used during translation of broadcast addresses into graphics device addresses, as described in more detail below. The same or different offset values can be associated with the graphics devices 18. Alternatively, the offset value can be stored in a single register, i.e., separate from the set of configuration registers 88, which is used for determining graphics device addresses for each graphics device. In this instance, the same offset value is used with each graphics device.

Figure 3:
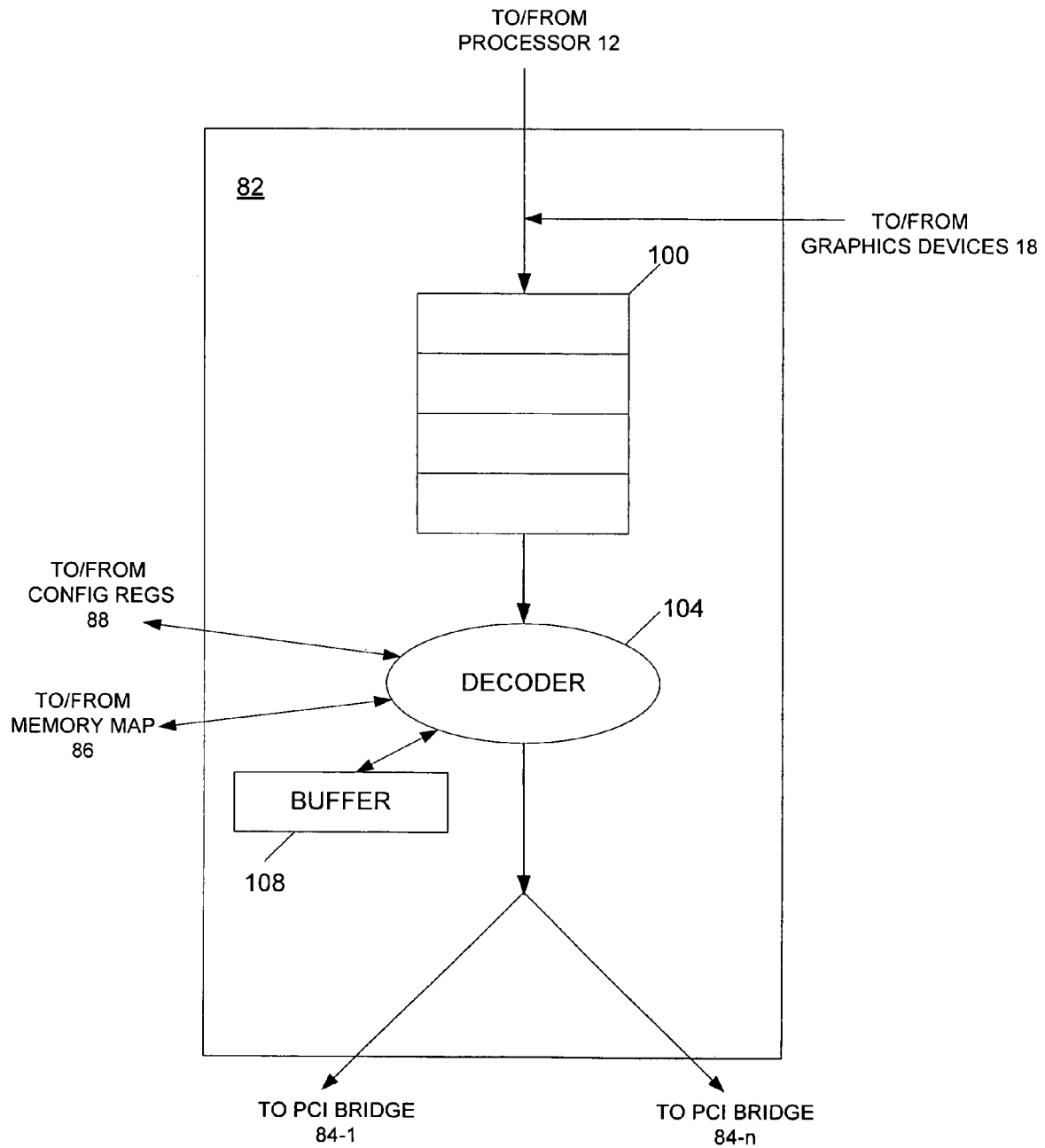
FIG. 3 shows a block diagram of an embodiment of an I/O controller for translating a request address of a write request into a plurality of addresses used to forward the write request to the plurality of graphics devices.

FIG. 3 shows an embodiment of the I/O controller (IOC) 82 including a request queue 100, a decoder 104, and a buffer (i.e., holding register) 108. Read and write requests from the processor 12 and from the graphics devices 18 arrive at the tail of the queue 100, and the decoder 104 processes these requests from the head of the queue 100. The decoder 104 is in communication with the memory map 86 and with the sets of configuration registers 88. In general, the decoder 104 uses the information from the memory map 86 and configuration registers 88 to translate request addresses in the write requests into graphics device addresses. The operations performed by the IOC 82 can be implemented in hardware, software (e.g., firmware), or in combinations thereof.

FIG. 4 shows an embodiment of the memory map 86 including a broadcast address range 124, a first graphics device address range 132, and a second graphics device address range 136. Arrow 120 denotes the start (i.e., first row of addresses) of the memory map 86. The broadcast address range 124 corresponds to the range of request addresses—in write requests—that translate into the multiple graphics device addresses, or, in the case of a peer-to-peer communication, into one or more graphics device addresses. Arrow 128 identifies a base address of the broadcast address range 124, arrow 138 identifies a base address of the first graphics device address range 132, and arrow 140 identifies a base address of the second graphics device address range 136.

Each set of configuration registers store values that define the base address location and size of each address range 132, 136. In general, each graphics device address range 132, 136 is larger than the broadcast address range 124. For example, in one embodiment the broadcast address range is 32 MB in size, and each graphics device address range 132, 136 is 256 MB in size.

Figure 5:
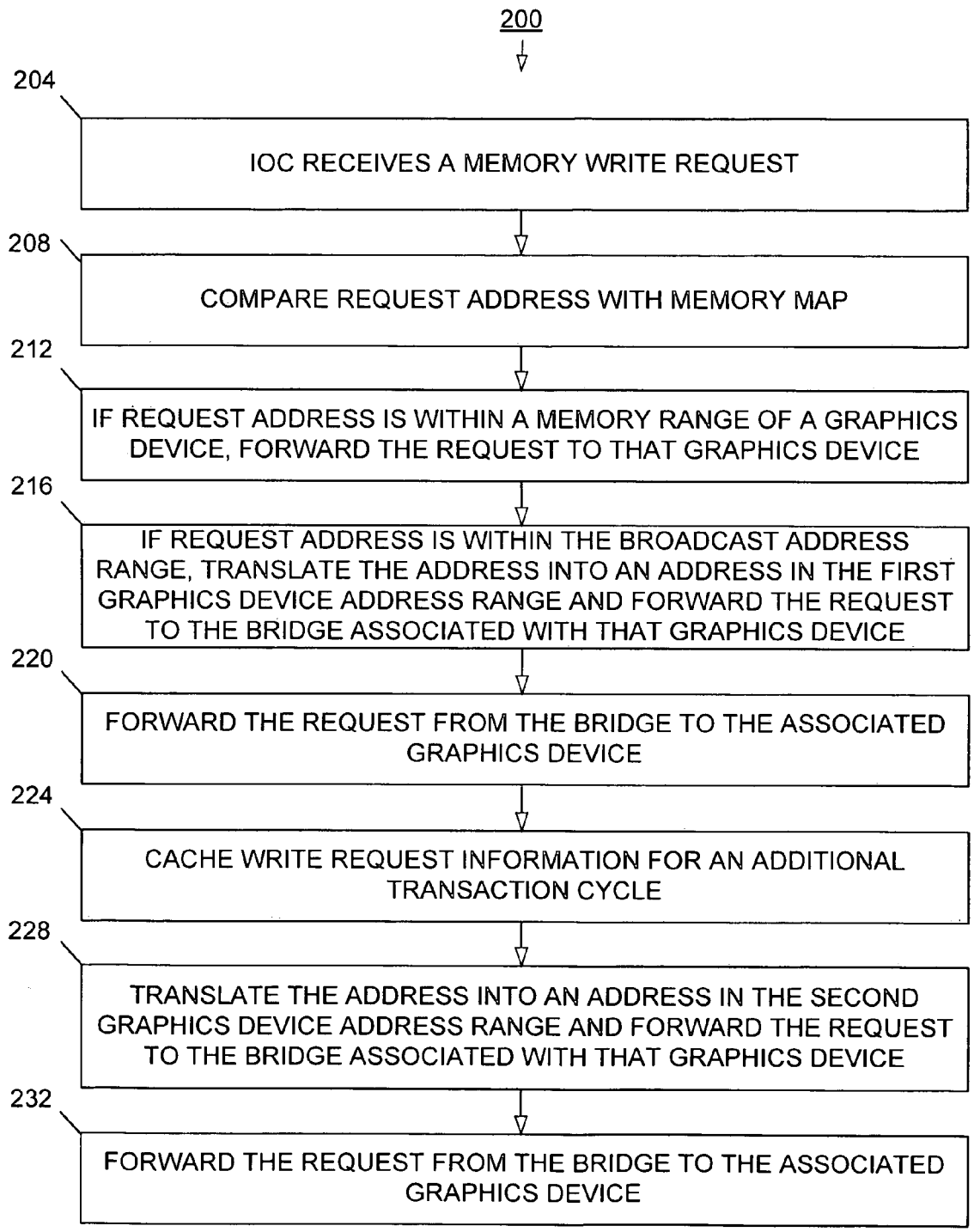
FIG. 5 is a flow diagram of an embodiment of a process for broadcasting a write request to the plurality of graphics devices.

FIG. 5 shows an embodiment of a process 200 for broadcasting a single write request to the plurality of graphics devices 18. In the description of the process 200, references are also made to features in FIG. 3 (IOC 82) and in FIG. 4 (memory map 86). At step 204, a memory write request arrives at the tail of the queue 100. Either the processor 12 or one of the graphics devices 18 can be the originator of the write request. The originator addresses the write request to a particular memory address, referred to as a request address. The decoder 104 retrieves the write request after the write request reaches the head of the queue 100 and compares (step 208) the request address with the memory map 86.

Consider, for purposes of illustrating the process 200, that the processor 12 is the originator of the memory write request. If the request address is within the memory range associated with one of the graphics devices 18, more specifically, within memory range 132 or memory range 136, then the decoder 104 forwards (step 212) the write request to the bridge 84 associated with that graphics device 18.

If, instead, the request address 144 of the write request is within the predefined broadcast address range, the decoder 104 translates (step 216) the request address into an address 148 within the first graphics device memory range 132 and forwards the write request to the bridge 84-1 associated with the first graphics device 18-1. The bridge 84 forwards (step 220) the write request to the graphics device 18-1. Depending upon the current workload of the bridge 84, the forwarding of the request may occur immediately or may need to wait in turn.

Because this write request is a broadcast request, as indicated by the request address falling within the broadcast address range, the IOC 82 keeps (step 224) the information associated with the write request, such as the request address, type of request, length, data, etc., in the buffer 108 for an additional transaction cycle. During a subsequent transaction cycle, the decoder 104 translates (step 228) the request address into an address 152 within the second graphics device memory range 136 and forwards the write request to the bridge 84-n associated with the second graphics device 18-n. The bridge 84-n sends (step 232) the write request to the secondary external graphics device 18-n in the next request delivery cycle. Thus, the IOC 82 translates and redirects a single memory write request issued by the processor 12 to the plurality of graphics devices 18. Steps 224, 228, and 232 can repeat for each additional graphics device (i.e., a third, a fourth, etc.) in the graphics-processing system.

The use of the buffer 108 is one exemplary embodiment of a technique for holding the write request information for more than one transaction cycle. In another embodiment, rather than use additional transaction cycles to forward an incoming write request to multiple graphics devices (i.e., GPUs), during the current transaction cycle circuitry can push the write request into separate queues, one queue for each graphics device (i.e., GPU). This allows a write request to arrive from the processor during each transaction cycle, provided the queues do not overflow (i.e., downstream processing of the write requests in the queues occurs punctually).

Figure 6:
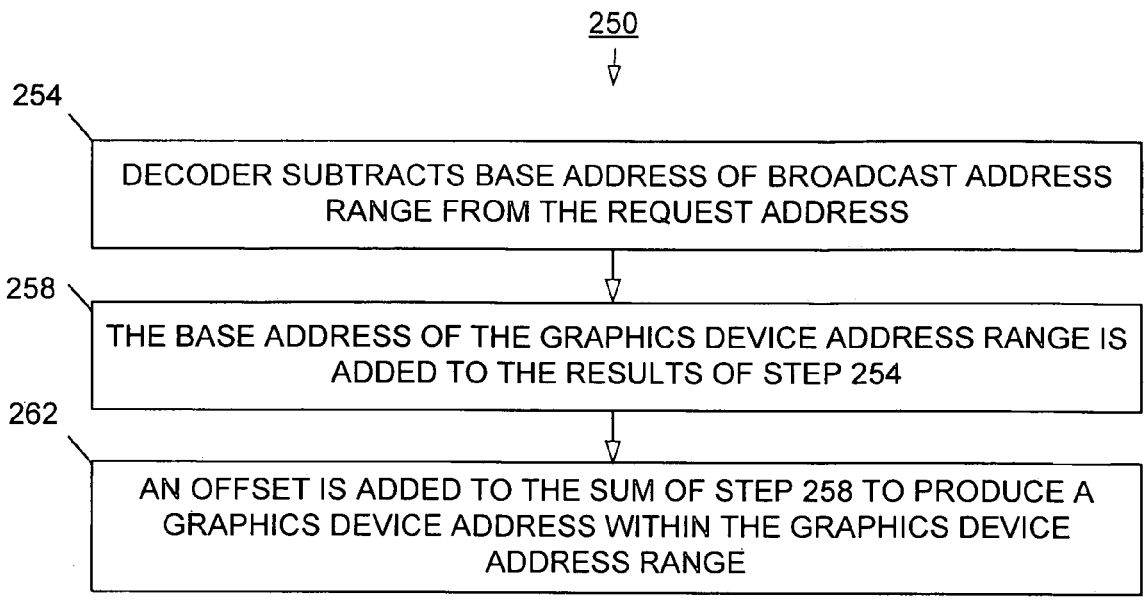
FIG. 6 is a flow diagram of an embodiment of a process for translating a request address of the write request into a graphics device address.

FIG. 6 shows an embodiment of a process 250 for translating a request address of a memory write request into a graphics device address. To perform the address translation, the decoder 104 uses the base address and offset values from the appropriate set of configuration registers 88 to translate the request address into a graphics device address. It is to be understood that the process 250 need not follow the particular order in which the steps are described.

In addition, it is to be understood that the base address is an example of a reference address to which an offset may be applied. In general, any address within the memory map 86 can serve as the reference address to which an offset is applied, provided the applied offset generates an address within the appropriate graphics device address range. For example, instead of using the base address as the reference address, other embodiments of the invention can use a different address within the graphics device address range, such as the last address of the range or a midpoint address of the range.

At step 254, the decoder 104 subtracts the start address of the broadcast address range from the request address. At step 258, the start address of the graphics device address range—the range associated with the graphics device for which the graphics device address is being calculated—is added to the result of the subtraction. At step 262, an offset is added to the result of the sum. The resulting graphics device address is within the graphics device address range associated with the graphics device. In general, the address translation is according to the following equation:

$$GD\_ADDRESS = REQUEST\_ADDRESS\_BROADCAST\_BASE + BASE\_ADDRESS + BROADCAST\_OFFSET,$$

where GD_ADDRESS refers to the graphics device address resulting from the translation, REQUEST_ADDRESS refers to the request address in the memory write request, BROADCAST_BASE refers to the start address of the broadcast address range 124, BASE_ADDRESS refers to the start address of the graphics device address range, and BROADCAST_OFFSET is the offset between the translated broadcast base address and the base address of the graphics device address range.

An advantage gained by use of the offset is to be able to map the broadcast address range to a desired section of the graphics device address range. Without the offset, the broadcast address range would map to the first address locations of each graphics device address range, potentially contending with graphics driver software that prefer to use the lower memory addresses for other operations. With the offset, a programmer of graphics driver software does not need to align the base address 128 of the broadcast address range 124 with the base address of each graphics device address range 132, 136.

When one of the graphics devices 18 is the originator of the memory write request, the process of broadcasting the write request to each other graphics device in the graphics-processing system is similar to that described for when the processor 12 is the originator. Consider, for purposes of illustrating peer-to-peer communications between graphics devices, that the graphics device sending the write request is the graphics device 18-1 (FIG. 1) and that there are, in total, four graphics devices within the graphics-processing system. Further, consider, for example, that the graphics device 18-1 is sending a copy of a texture map to each of the other graphics devices. The decoder 104 retrieves, translates, and forwards the write request to each graphics devices—in a manner similar to that described in FIG. 5—other than to the graphics device 18-1 that originated the write request. Thus, in this exemplary graphics-processing system with four graphics devices, the decoder 104 translates the request address into three different graphics device addresses in three different graphics device address ranges associated with the three other graphics devices.

This address translation and broadcast does not apply to memory read requests from the processor 12 (or from the graphics device 18). In general, upon issuing a read request, the processor 12 (or graphics device 18) expects to receive one reply only. Accordingly, for a memory read request with a request address within the broadcast address range, the decoder 104 translates the request address to one of the graphics devices 18 only (e.g., the primary graphics device) using, for example, the above equation described in FIG. 6, and forwards the read request to the bridge 84 associated with that graphics devices.

Although the invention has been shown and described with reference to specific preferred embodiments, it should be understood by those skilled in the art that various changes in form and detail may be made therein without departing from the spirit and scope of the invention as defined by the following claims.

What is claimed is:

1. A graphics-processing system comprising:
 a central processing unit (CPU) issuing commands and data, and further issuing a first write request to a first memory address;
 a plurality of graphics devices operating in parallel to render computer graphics based on the commands and data issued by the CPU, a first one of the graphics devices issuing, in response to the commands and data issued by the CPU, a second write request to a second memory address; and
 a controller, in communication with the plurality of graphics devices and the CPU, receiving the first write request from the CPU and the second write request from the first one of the graphics devices, the controller broadcasting the first write request received from the CPU to the plurality of graphics devices when the first memory address of the first write request is within a particular range of broadcast addresses, and broadcasting the second write request received from the first one of the graphics devices to the other graphics devices of the plurality of graphics devices when the second memory address of the second write request is within the particular range of broadcast addresses.

2. The graphics-processing system of claim 1, wherein the controller generates a plurality of graphics device addresses from the memory address of each write request by applying an offset to a reference address for each graphics device.

3. The graphics-processing system of claim 2, further comprising program code for configuring the offset applied when generating each graphics device address.

4. The graphics-processing system of claim 2, wherein the same offset is applied when generating each graphics device address.

5. The graphics-processing system of claim 2, wherein the reference address for each graphics device is a base address of an address range associated with that graphics device.

6. A graphics-processing system comprising:
 a plurality of graphics devices, each graphics device having an associated range of graphics device addresses, one of the graphics devices submitting a first write request to a first memory address;
 a processor submitting a second write request to a second memory address;
 a controller receiving the first write request from the processor and the second write request from the one of the graphics devices, the controller broadcasting the first write request received from the CPU to the plurality of graphics devices when the first memory address is within a particular range of broadcast addresses, the controller broadcasting the second write request received from the one of the graphics devices to the other devices of the plurality of graphics devices when the second memory address is within the particular range of broadcast addresses, the controller generating for each write request a graphics device address within each range of graphics device addresses based on the memory address of that write request when that memory address is within the particular range of broadcast addresses, the controller generating the graphics device address within each range of graphics device addresses by acquiring a reference address for that range of graphics device addresses, applying an offset value to the reference address to map the range of broadcast addresses to a particular subset of graphics device addresses within that range of graphics device addresses, and translating that memory address into the graphics device address by subtracting a base address of the range of broadcast addresses from that memory address and adding thereto the reference address offset by the offset value, the controller forwarding the each write request to each graphics device associated with one of the generated graphics device addresses.

7. The graphics-processing system of claim 6, further comprising program code for configuring the offset value applied when generating each graphics device address.

8. The graphics-processing system of claim 6, wherein the same offset value is applied when generating each graphics device address.

9. The graphics-processing system of claim 6, wherein the reference address for each graphics device is a base address of the graphics device address range associated with that graphics device.

10. An integrated circuit chip set, comprising:
a central processing unit (CPU) issuing commands and data, and further issuing a first write request to a first request address;
a plurality of bridges, each bridge being associated with a different range of graphics device addresses for communicating with one of a plurality of graphics devices, one of the graphics devices issuing a second write request to a second request address;
a register for storing an offset value;
a controller receiving the first write request from the CPU and the second write request from the one of the graphics devices and broadcasting the first write request received from the CPU to the plurality of graphics devices when the first request address is within a particular range of broadcast addresses, the controller broadcasting the second write request received from the one of the graphics devices to the other devices of the plurality of graphics devices when the second request address is within the particular range of broadcast addresses, the controller generating for each write request a graphics device address within each range of graphics device addresses from the request address of that write request when the request address is within the particular range of broadcast addresses, the controller generating the graphics device address within each range of graphics device addresses by acquiring a reference address for that range of graphics device addresses, applying the offset value to the reference address to map the range of broadcast addresses to a particular subset of graphic device addresses within that range of graphics device addresses, and translating the request address into the graphics device address by subtracting a base address of the range of broadcast addresses from the request address and adding thereto the reference address offset by the offset value, the controller forwarding each write request to each bridge associated with one of the graphics device addresses generated for that write request.

11. The integrated circuit chipset of claim 10, wherein the same offset value is applied when generating each graphics device address.

12. The integrated circuit chipset of claim 10, wherein the reference address for each bridge is a base address of the range of graphics device addresses associated with that bridge.

13. An integrated circuit chip set, comprising:
a plurality of bridges, each bridge communicating with one of a plurality of graphics devices operating in parallel to render computer graphics based on commands and data issued by a central processing unit (CPU);
a controller receiving from one of the bridges a first write request issued by one of the graphics devices and directed to a first request address, the controller broadcasting the first write request to the other bridges for forwarding to the other graphics devices when the first request address of the first write request is within a particular range of broadcast addresses, wherein the CPU issues a second write request to a second request address and the controller broadcasts the second write request to the plurality of bridges when the second request address is within the particular range of broadcast addresses.

14. The integrated circuit chip set of claim 13, wherein the controller generates a plurality of graphics device addresses based on the memory address of each write request by applying an offset to a reference address for each bridge.

15. The integrated circuit chip set of claim 14, wherein the same offset is applied when generating each graphics device address.

16. The integrated circuit chip set of claim 14, wherein the reference address for each bridge is a base address of a range of graphics device addresses associated with that bridge.

17. A method for broadcasting write requests to a plurality of graphics devices, each graphics device having an associated range of graphics device addresses, the method comprising:
receiving from the processor a first write request directed to a first memory address;
receiving from one of the graphics devices a second write request directed to a second memory address;
broadcasting the first write request received from the processor to the plurality of graphics devices when the first memory address is within a particular range of broadcast addresses;
broadcasting the second write request received from the one of the graphics devices to the other graphics devices when the second memory address is within the particular range of broadcast addresses;
generating a graphics device address within each range of graphics device addresses based on the memory address of each write request when the memory address of that write request is within the particular range of broadcast addresses, the graphics device address within each range of graphics device addresses being generated by acquiring a reference address for that range of graphics device addresses, applying an offset value to the reference address to map the range of broadcast addresses to a particular subset of graphic device addresses within that range of graphics device addresses, and translating the memory address of that write request into the graphics device address by subtracting a base address of the range of broadcast addresses from the memory address of that write request and adding thereto the reference address offset by the offset value; and
forwarding each write request to each graphics device of the plurality of graphics devices associated with one of the graphics device addresses generated for that write request.

18. The method of claim 17, wherein the applying of an offset value includes applying the same offset value when generating each graphics device address.

19. The method of claim 17, wherein the reference address for each graphics device is a base address of the graphics device address range associated with that graphics device.

20. A method for broadcasting write requests to a plurality of graphics devices, the method comprising:
- providing a plurality of graphics devices that render graphical images in parallel based on commands and data issued by a central processing unit (CPU);
- receiving from the CPU a first write request directed to a first memory address;
- receiving from a first one of the graphics devices a second write request directed to a second memory address;
- broadcasting the first write request received from the CPU to the plurality of graphics devices when the first memory address of the first write request is within a particular range of broadcast addresses; and
- broadcasting the second write request received from the first one of the graphics devices to the other graphics devices of the plurality of graphics devices when the second memory address of the second write request is within the particular range of broadcast addresses.

21. The method of claim 20, further comprising the steps of generating a plurality of graphics device addresses based on the memory address of each write request; and applying an offset to a reference address for each graphics device when generating the plurality of graphics device addresses.

22. The method of claim 21, wherein the step of applying an offset applies the same offset when generating each graphics device address.

23. The method of claim 21, wherein the reference address for each graphics device is a base address of an address range associated with that graphics device.

* * * * *